(12) United States Patent
Takehara et al.

(10) Patent No.: US 7,796,357 B2
(45) Date of Patent: Sep. 14, 2010

(54) INFORMATION RECORDING AND PLAYBACK APPARATUS AND METHOD OF MANUFACTURING THE SAME

(75) Inventors: Isamu Takehara, Chiba (JP); Shinji Kinoshita, Chiba (JP); Hiromitsu Gotoh, Chiba (JP)

(73) Assignee: Seiko Instruments Inc. (JP)

( * ) Notice: Subject to any disclaimer, the term of this patent is extended or adjusted under 35 U.S.C. 154(b) by 771 days.

(21) Appl. No.: 11/628,892

(22) PCT Filed: May 31, 2005

(86) PCT No.: PCT/JP2005/009941
§ 371 (c)(1),
(2), (4) Date: May 4, 2007

(87) PCT Pub. No.: WO2005/122171
PCT Pub. Date: Dec. 22, 2005

(65) Prior Publication Data
US 2007/0291406 A1 Dec. 20, 2007

(30) Foreign Application Priority Data
Jun. 11, 2004 (JP) ............... 2004-174734

(51) Int. Cl.
*G11B 33/12* (2006.01)
(52) U.S. Cl. .................................. 360/99.08
(58) Field of Classification Search ........... None
See application file for complete search history.

(56) References Cited

U.S. PATENT DOCUMENTS

| | | | |
|---|---|---|---|
| 4,553,183 A * | 11/1985 | Brown et al. | 360/97.02 |
| 5,195,002 A * | 3/1993 | Sakurai | 360/99.08 |
| 5,296,981 A | 3/1994 | Ogawa | |
| 5,334,896 A * | 8/1994 | Ohsawa | 310/67 R |

(Continued)

FOREIGN PATENT DOCUMENTS

JP 4-112655 A 4/1992

(Continued)

*Primary Examiner*—Mark Blouin
(74) *Attorney, Agent, or Firm*—Adams & Wilks

(57) ABSTRACT

An object is to provide an information recording and playback apparatus that is capable of reducing, as much as possible, reading and writing errors caused by magnetic leakage flux on the inner peripheral side of a magnetic disk. An information recording and playback apparatus 1 includes a rotor R rotatably holding a magnetic disk 60 and being provided with a permanent magnet 51 on the outer peripheral surface; a stator core 3 fixed to a base member 2, the stator core 3 protruding to the inner side in the radial direction in such a manner as to oppose the permanent magnet 51, the stator core 3 including a plurality of stator poles 3a around which coils 3b are wound; a shield plate 70 disposed between the magnetic disk 60 and the stator core 3 in such a manner as to cover the stator core 3 and to have a small gap 62 between the rotating body R, the shielding plate 70 blocking magnetic flux from the permanent magnet 51 and the stator core 3; and a magnetic head 61 for carrying out recording and playback of the magnetic disk 60 by moving forward and backward between the shield plate 70 and the magnetic disk 60. The magnetic head 61 moves forward and backward on the stator poles 3a.

16 Claims, 11 Drawing Sheets

U.S. PATENT DOCUMENTS

| | | | |
|---|---|---|---|
| 5,877,916 A * | 3/1999 | Papst | 360/98.07 |
| 6,271,988 B1 * | 8/2001 | Papst | 360/98.07 |
| 6,282,053 B1 * | 8/2001 | MacLeod et al. | 360/98.07 |
| 6,774,520 B2 * | 8/2004 | Wauke | 310/156.45 |
| 6,979,931 B1 * | 12/2005 | Gustafson et al. | 310/254.1 |
| 2001/0040411 A1 | 11/2001 | Kitahori et al. | |

FOREIGN PATENT DOCUMENTS

| | | |
|---|---|---|
| JP | 5-62447 A | 3/1993 |
| JP | 5-184095 A | 7/1993 |
| JP | 5-284710 A | 10/1993 |
| WO | WO-00/62404 A1 | 10/2000 |

* cited by examiner

INFORMATION RECORDING AND PLAYBACK APPARATUS AND METHOD OF MANUFACTURING THE SAME

CROSS-REFERENCE TO RELATED APPLICATIONS

This application is a U.S. national stage application of International Application No. PCT/JP2005/009941, filed May 31, 2005, claiming a priority date of Jun. 11, 2004, and published in a non-English language.

TECHNICAL FIELD

The present invention relates to an information recording and playback apparatus whose magnetic leakage flux is reduced as much as possible and to a method of manufacturing the same.

BACKGROUND ART

Recently, information recording and playback apparatuses using hard disk drive (hereinafter referred to as HDDs) devices have started to be widely used for portable music players and mobile phones. There is a need for a further reduction in the size of such information recording and playback apparatuses, and, in accordance with this need, there is a tendency to reduce the size of HDDs. Under such conditions, HDDs that include magnetic disks, which are information recording media and are smaller than 1 inch (25.4 mm), are required to have high capacity.

To achieve the object of obtaining high capacity, efforts have continuously been made to achieve high-density and high-speed to correspond to a twofold increase in the area density of the magnetic disk (tracks×line density) by employing technologies for increasing the performance of the magnetic head based on a vertical magnetization method and for decreasing the flying height to several tens of nanometers or smaller. In this way, high density and high speed, which are a natural consequence of for achieving high capacity, cause the generation of data reading and writing errors, which has become a great problem.

One cause of such reading and writing errors is magnetic leakage flux from the motor device of the HDD. As a technique to solve this problem, Patent Document 1 listed below proposes an apparatus whose head has a movement trajectory positioned at an intermediate section between projecting cores.

Patent Document 1:

PCT International Publication No. WO00/62404 Pamphlet (p. 12, FIGS. 6 and 9)

SUMMARY OF INVENTION

In fact, in the above-listed Patent Document 1, magnetic leakage flux has been studied in general. However, as a result of a detailed study carried out by the present inventors, it has been discovered that, on the inner circumference of a magnetic disk, magnetic leakage flux remains nonnegligible and, in particular, reading and writing errors occur often.

The present invention has been conceived in light of the problems described above. Accordingly, it is an object of the present invention to provide an information recording and playback apparatus that is capable of reducing, as much as possible, reading and writing errors caused by magnetic leakage flux on the inner peripheral side of a magnetic disk and a method of producing the same.

To solve the above-identified problem, the information recording and playback apparatus and the method of producing the same according to the present invention employ the following means.

An information recording and playback apparatus according to the present invention includes:

a rotating body rotatably holding a magnetic disk and being provided with a permanent magnet on an outer peripheral surface of the rotating body;

a stator core fixed to a base member, the stator core protruding toward the inner side in the radial direction in such a manner as to oppose the permanent magnet, the stator core including a plurality of stator poles around which winding wires are wound;

a shield member disposed between the magnetic disk and the stator core in such a manner as to cover the stator core and to have a small gap between the rotating body, the shielding member blocking magnetic flux from the permanent magnet and the stator core; and a magnetic head for carrying out recording and playback of the magnetic disk by moving forward and backward between the shield member and the magnetic disk, wherein the magnetic head moves forward and backward on the stator poles.

As a result of extensive investigation by the inventors, it was discovered that there is less magnetic flux leakage at the positions where the magnetic head moves forward and backward on the stator poles than at the positions where the magnetic head moves forward and backward between the stator poles. The magnetic flux leakage was prominent on the inner peripheral side (positions closer to the rotating body). According to the present invention, the magnetic flux leakage at the positions on the inner peripheral side can be reduced as much as possible. In this way, reading and writing errors made by the magnetic head on the inner peripheral side of the magnetic disk are reduced.

Another information recording and playback apparatus according to the present invention includes:

a rotating body rotatably holding a magnetic disk and being provided with a permanent magnet on an outer peripheral surface of the rotating body;

a stator core fixed to a base member, the stator core protruding to the inner side in the radial direction in such a manner as to oppose the permanent magnet, the stator core including a plurality of stator poles around which winding wires are wound;

a shield member disposed between the magnetic disk and the stator core in such a manner as to cover the stator core and to have a small gap between the rotating body, the shielding member blocking magnetic flux from the permanent magnet and the stator core; and a magnetic head for carrying out recording and playback of the magnetic disk by moving forward and backward between the shield member and the magnetic disk, wherein the rotating body includes a disk section interposed between the permanent magnet and the magnetic disk in such a manner as to cover the permanent magnet;

a protruding edge section protruding to the outer peripheral surface side of the permanent magnet is provided on the outer edge of the disk section, and the small gap is formed between the inner edge section of the shield member and the outer edge of the disk section.

Since the protruding edge section protruding to the outer peripheral surface side of the permanent magnet is provided on the outer edge of the disk section that is provided on the rotating body and since the small gap is formed between the outer edge including the protruding edge section and the inner edge section of the shield member, the magnetic flux emitted to the magnetic disk side is blocked by the protruding edge section, preventing the magnetic flux from leaking from the small gap to the magnetic disk side.

Another information recording and playback apparatus according to the present invention includes:

a rotating body rotatably holding a magnetic disk and being provided with a permanent magnet on an outer peripheral surface of the rotating body;

a stator core fixed to a base member, the stator core protruding to the inner side in the radial direction in such a manner as to oppose the permanent magnet, the stator core including a plurality of stator poles around which winding wires are wound;

a shield member disposed between the magnetic disk and the stator core in such a manner as to cover the stator core and to have a small gap between the rotating body, the shielding member blocking magnetic flux from the permanent magnet and the stator core;

and a magnetic head for carrying out recording and playback with the magnetic disk by moving forward and backward between the shield member and the magnetic disk, wherein the small gap is formed between the inner edge section of the shield member and the outer circumferential surface of the rotating body, and a bent section that is bent toward the stator core side is provided on the inner edge section of the shield member.

Since the bent section that is bent toward the stator core side is provided on the inner edge section of the shield member and since the small gap is formed between the bent section and the inner edge section of the shield member, the magnetic flux emitted to the magnetic disk side is blocked by the bent section, preventing the magnetic flux from leaking from the small gap to the magnetic disk side.

Another information recording and playback apparatus according to the present invention includes:

a rotating body rotatably holding a magnetic disk and being provided with a permanent magnet on an outer peripheral surface of the rotating body;

a stator core fixed to a base member, the stator core protruding to the inner side in the radial direction in such a manner as to oppose the permanent magnet, the stator core including a plurality of stator poles around which winding wires are wound;

a shield member disposed between the magnetic disk and the stator core in such a manner as to cover the stator core and to have a small gap between the rotating body, the shielding member blocking magnetic flux from the permanent magnet and the stator core; and a magnetic head for carrying out recording and playback with the magnetic disk by moving forward and backward between the shield member and the magnetic disk, wherein the rotating body includes a disk section interposed between the permanent magnet and the magnetic disk in such a manner as to cover the permanent magnet, and the small gap is formed by inserting the inner edge section of the shield member between the disk section and the magnetic disk.

Since the small gap is formed by inserting the inner edge section of the shield member between the disk section and the magnetic disk, the opening of the small gap does not face the magnetic disk. Therefore, even when magnetic flux leaks from the small gap, the magnetic flux can be prevented from reaching the magnetic disk side. Since a centrifugal force is applied to the front surface of the disk plate at the small gap caused by the rotation of the disk section, dust generated at the stator core side does not enter the magnetic disk side.

With the information recording and playback apparatuses according to the present invention, magnetic material may be provided between the stator poles.

The magnetic material provided between the stator poles absorbs magnetic flux, preventing magnetic flux leakage to the outside.

With the information recording and playback apparatuses according to the present invention, a ring-shaped member constituted of magnetic material may be provided on the rotating body side of each stator pole.

The ring-shaped member that is constituted of magnetic material and that is provided on the rotating body side of each stator pole prevents magnetic flux leakage by absorbing the magnetic flux.

According to the present invention, in a method of producing an information recording and playback apparatus including a rotating body rotatably holding a magnetic disk and being provided with a permanent magnet on an outer peripheral surface of the rotating body, a stator core fixed to a base member, the stator core protruding to the inner side in the radial direction in such a manner as to oppose the permanent magnet, the stator core including a plurality of stator poles around which winding wires are wound, a shield member disposed between the magnetic disk and the stator core in such a manner as to cover the stator core and to have a small gap between the rotating body, the shielding member blocking magnetic flux from the permanent magnet and the stator core, the method comprises the steps of:

disposing the stator core, the rotating body, and the shield member on the base member;

inserting a plurality of alignment pins into the small gap between the inner edge section of the shield member and the outer peripheral surface of the rotating body to keep the small gap substantially uniform in the circumferential direction; and fixing the disk to the rotating body after retracting the alignment pins.

By employing a method of keeping the small gap uniform in the circumferential direction using alignment pins, the gap can be maintained accurately during production even when the small gap is extremely small.

According to the present invention, the following advantage is achieved. Namely, an information recording and playback apparatus that is capable of reducing, as much as possible, reading and writing errors caused by magnetic leakage flux on the inner peripheral side of a magnetic disk and a method of producing the same are provided.

DETAILED DESCRIPTION OF THE INVENTION

Information recording and playback apparatuses (hereinafter referred to as HDDs) and methods of producing the same according to embodiments of the present invention will be described with reference to the drawings.

First, a first embodiment of the present invention will be described with reference to FIGS. 1 to 3.

Figure 1:
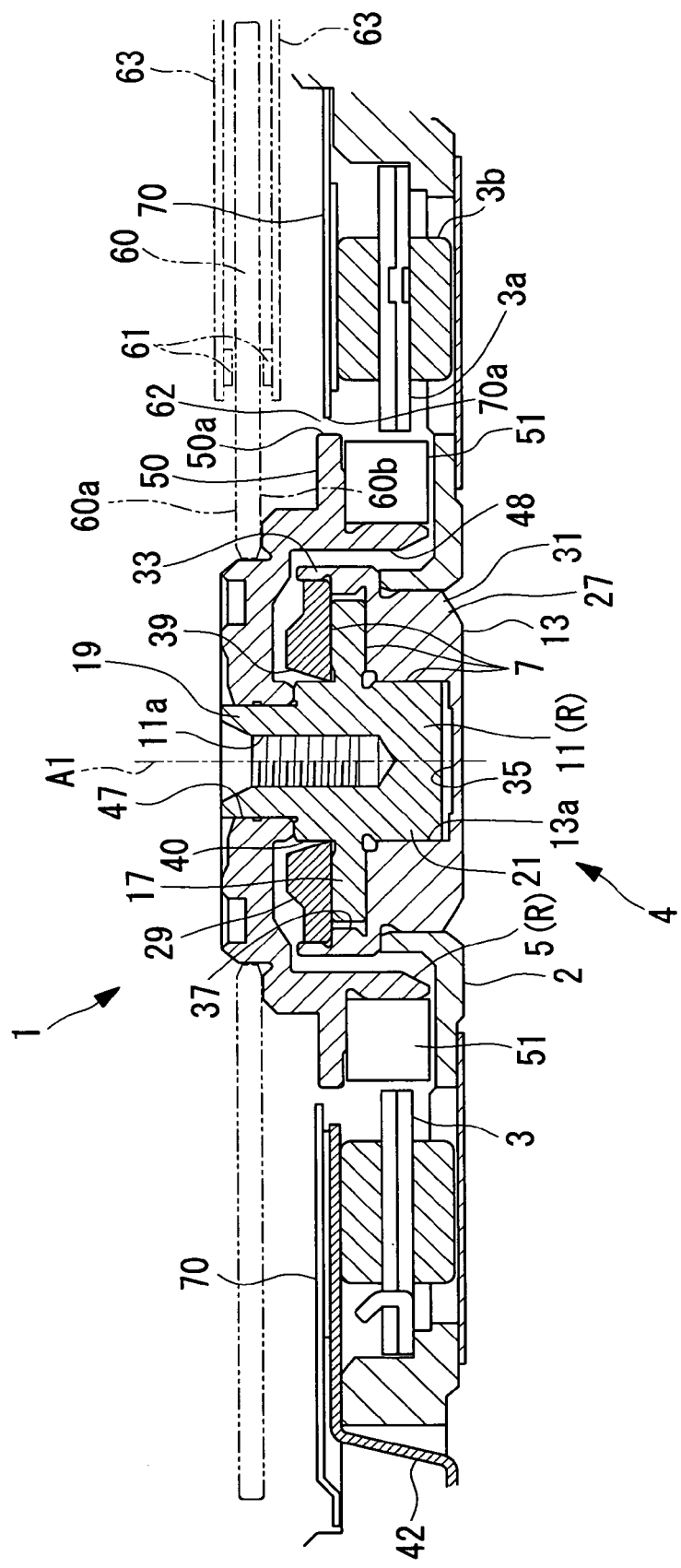
FIG. 1 a cross-section of an HDD according to a first embodiment of the present invention.

An HDD 1, as shown in FIG. 1, includes a metal base member 2 constituting a chassis therefor and a motor 4 attached to the base member 2.

The motor 4 includes a stator core 3 that is fixed to the base member 2, a rotor (rotating body) R that rotates around a center axis A1 with respect to the stator core 3, and a hydrodynamic pressure bearing 7 that rotatably supports the rotor R.

The hydrodynamic pressure bearing 7 is constituted by filling lubricant oil between a cylindrical shaft 11 that has a substantially cross-shaped cross-section and a sleeve 13 that has a shaft inserting hole 13a and a substantially cross-shaped cross-section and that is capable of rotatably accommodating the shaft 11.

The shaft 11 includes a thrust shaft section 17 protruding outward in the radial direction from the center part in the direction of the central axis A1, a substantially columnar supporting section 19 protruding in both directions of the central axis A1 (vertical direction in FIG. 1), and a radial shaft section 21. The thrust shaft section 17, the supporting section 19, and the radial shaft section 21 are provided as a single unit.

A plurality of hydrodynamic-pressure generating grooves having a so-called herringbone shape is formed on the outer peripheral surface of the radial shaft section 21. A plurality of spiral hydrodynamic-pressure generating grooves is formed on both end surfaces (front and back ends) of the thrust shaft section 17. The hydrodynamic-pressure generating grooves for the thrust shaft section 17 also may be herringbone shaped.

The sleeve 13 includes a cylindrical sleeve main body 27 with a bottom surface and a counter plate 29. The counter plate 29 disposed in such a manner that the supporting section 19 of the shaft 11 protrudes upward in FIG. 1, that a gap is provided between the shaft 11, and that the counter plate 29 covers the open end of the sleeve main body 27.

The sleeve main body 27 includes a small-diameter cylindrical section 31 whose base section (lower edge) is fixed to the base member 2 and a large-diameter cylindrical section 33 that is disposed above the small-diameter cylindrical section 31.

The small-diameter cylindrical section 31 has a hole 35 constituting the closed edge (base edge) side of the shaft inserting hole 13a. The radial shaft section 21 can be inserted into the hole 35. When the shaft 11 is rotated, hydrodynamic pressure is generated by collecting the lubricant oil in the gap between the inner peripheral surface of the hole 35 and the outer peripheral surface of the radial shaft section 21.

The large-diameter cylindrical section 33 has a through-hole 37 constituting the open edge side of the shaft inserting hole 13a. The thrust shaft section 17 is inserted into the through-hole 37.

The counter plate 29 is disk-shaped, and a through-hole 39 for inserting the supporting section 19 in the direction of the central axis A1 is formed therein. The through-hole 39 constitutes the shaft inserting hole 13a, together with the hole 35 of the small-diameter cylindrical section 31 and the through-hole 37 of the large-diameter cylindrical section 33.

A capillary seal 40 is provided between the counter plate 29 and the supporting section 19. The capillary seal 40 prevents lubricant oil from leaking from the gap between the shaft 11 and the shaft inserting hole 13a.

When the shaft 11 is rotated, thrust hydrodynamic pressure is generated by collecting the lubricant oil in the gap between the front surface (upper surface in the drawing) of the thrust shaft section 17 and the back surface (lower surface in the drawing) of the counter plate 29 and the gap between the back surface (lower surface in the drawing) of the thrust shaft section 17 and the end surface (upper surface in the drawing) of the small-diameter cylindrical section 31.

The stator core 3 is constituted by stacking a plurality of core members in the direction of the central axis A1. As shown in FIG. 2, the stator core 3 has an outer shape that is circular and includes a plurality of stator poles 3a protruding from the outer peripheral side to the inner peripheral side (inner side in the radial direction). Teeth sections 3c, having a width W extending in the circumferential direction, are provided at the tips of the stator poles 3a. Coils (winding wires) 3b are wound around the stator poles 3a (refer to FIG. 1). The coils 3b are electrically connected to a power supply (not shown in the drawing) via a cable 42. The stator poles 3a and the coils 3b generate an alternating magnetic field.

Figure 2:
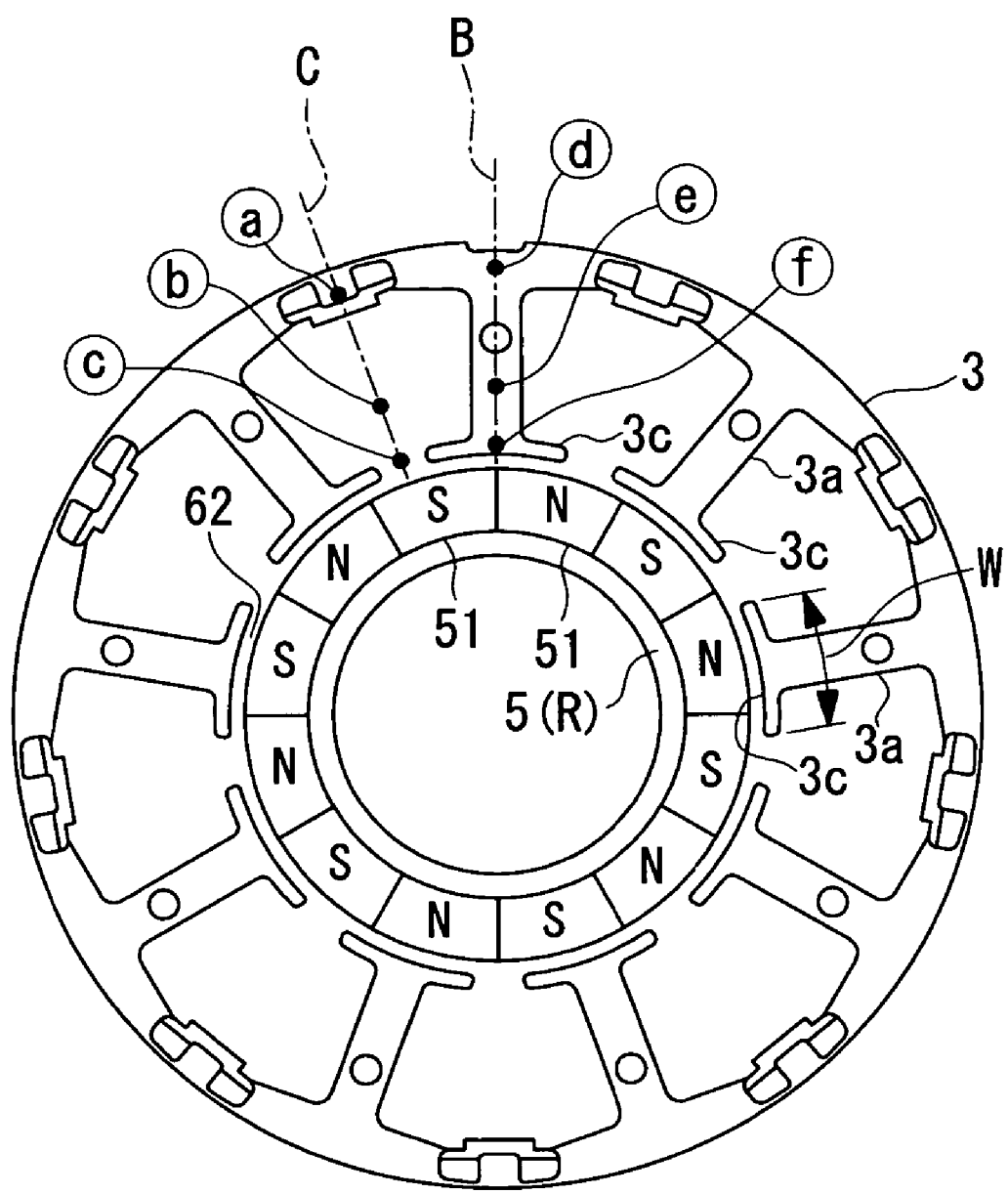
FIG. 2 a plan view illustrating the positional relationship of a stator core and a magnet.

As shown in FIGS. 1 and 2, the tips of the stator poles 3a are disposed opposite to a permanent magnet 51 fixed to the outer periphery of the rotor R.

The rotor R is constituted of the shaft 11 and a hub 5 fixed to the shaft 11.

A through-hole 47 centered on the central axis A1 is formed in the hub 5. The supporting section 19 of the shaft 11 is inserted in the through-hole 47 and is fixed. The sleeve 13 is stored in a non-contact state inside a cylindrical section 48 that is included in the hub 5. A disk section 50 protruding outward is provided on the outer periphery of the cylindrical section 48. The permanent magnet 51 is fixed at the lower area of the disk section 50 in FIG. 1. The permanent magnet 51 has a plurality of poles in a toric pattern (refer to FIG. 2). The permanent magnet 51 is a radial anisotropic or an isotropic neogium magnet whose flux directions at the poles match the radial direction of the permanent magnet 51.

By generating an alternating magnetic field with the coils 3b with respect to the permanent magnet 51, the rotor R (hub 5 and shaft 11) is rotationally driven around the central axis A1.

A magnetic disk 60 is fixed on the upper area of the hub 5. In other words, the inner periphery of a hole formed in the magnetic disk 60 is engaged with the outer periphery of the upper end of the hub 5. Although not shown in the drawing, the magnetic disk 60 is securely fixed with a fixing member screwed into a screw groove 11a having an axial line matching the central axis A1 of the shaft 11.

The front surface 60a and the back surface 60b of the magnetic disk 60 are provided with magnetic recording layers that are constituted of magnetic material and that are used for recording various types of information.

When reading and writing information, two magnetic heads 61 are disposed close to the front surface 60a and the back surface 60b of the magnetic disk 60. A metal magnetic film is provided on the front surface of the magnetic heads 61 so as to enable recording of information on the magnetic recording layers of the magnetic disk 60 and playback of the information recorded in the magnetic recording layers.

The magnetic heads 61 can be moved forward and backward by a swing arm 63. In other words, the magnetic heads 61 can be moved forward and backward from the outer peripheral side to the inner peripheral side of the magnetic disk from a retracted position, where the magnetic heads 61 is retracted from the magnetic disk.

A shield plate (shield member) 70 is disposed between the magnetic disk 60 and the stator core 3 and between the magnetic disk 60 and the coils 3b in such a manner as to cover the stator core 3. A hole 70a is formed in the center of the shield plate 70. The edge of the inner periphery constituting the hole 70a opposes the outer edge 50a of the disk section 50 of the hub 5 with a small gap 62 in between. The small gap 62 is about 0.1 to 0.3 mm when the magnetic disk is 1 inch. The outer periphery of the shield plate 70 is fixed to the base member 2.

The shield plate 70 is constituted of a magnetic material, such as martensitic stainless steel, and absorbs the magnetic leakage flux generated at the permanent magnet 51 stator core 3 and the coils 3b.

In FIG. 1, the positions at the right and the left, in the drawing, of the shield plate 70 in the direction of the central axis A1 (the height direction in the drawing) differ. This is because the position at the right of the shield plate 70 is an area where the swing arm 63, including the magnetic heads 61, is moved forward and backward, and the position of the shield plate 70 is moved downward in the drawing to prevent interference with the swing arm 63.

FIG. 2 illustrates the trajectory of the magnetic heads 61. The magnetic heads according to this embodiment move forward and backward over the stator poles 3a of the stator core 3 (refer to line B in the drawing). This is because there is less magnetic leakage flux on the stator poles 3a. This reason is apparent from the experimental results shown in FIG. 3.

The inventors measured the magnetic flux density by applying an electrical current to each of the coils 3b while the motor is actually driven. At this time, the shield plate 70 remained attached.

Figure 3:
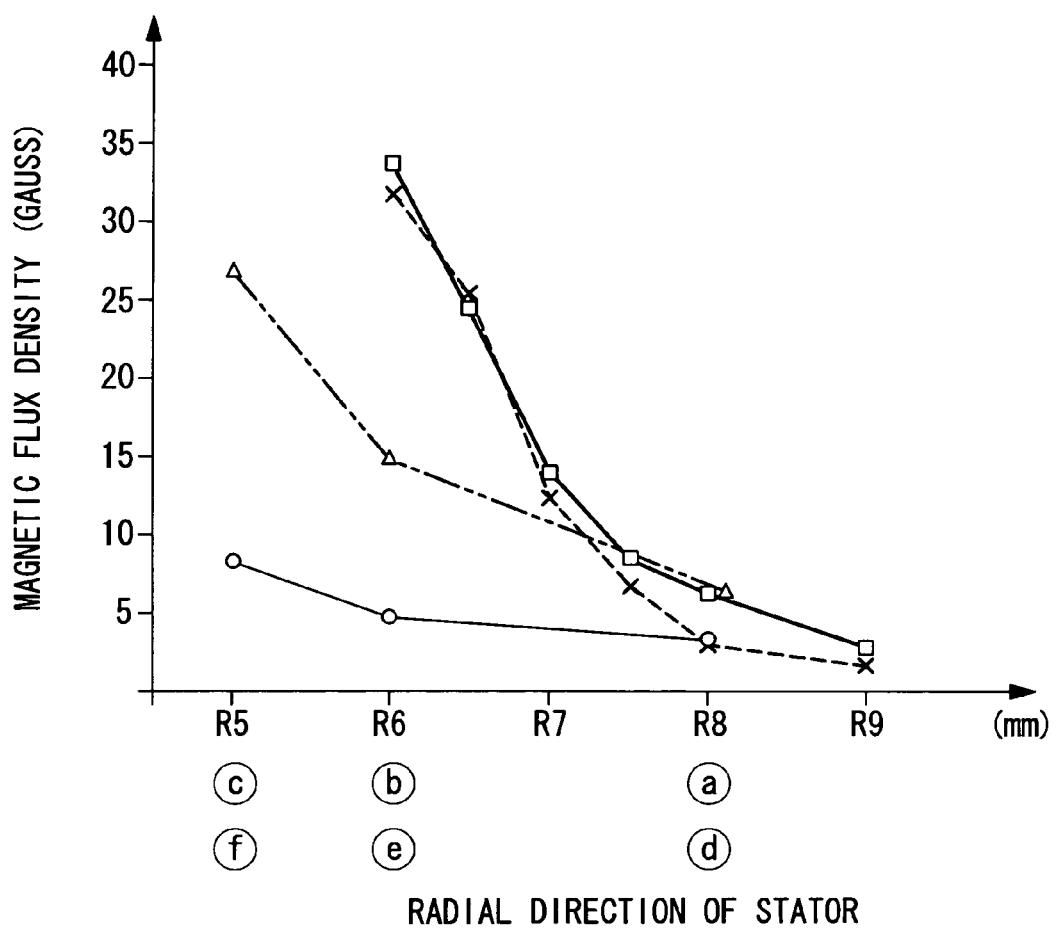
FIG. 3 experimental results of measuring magnetic flux density at positions where a magnetic head is moved forward and backward.
Figure 6:
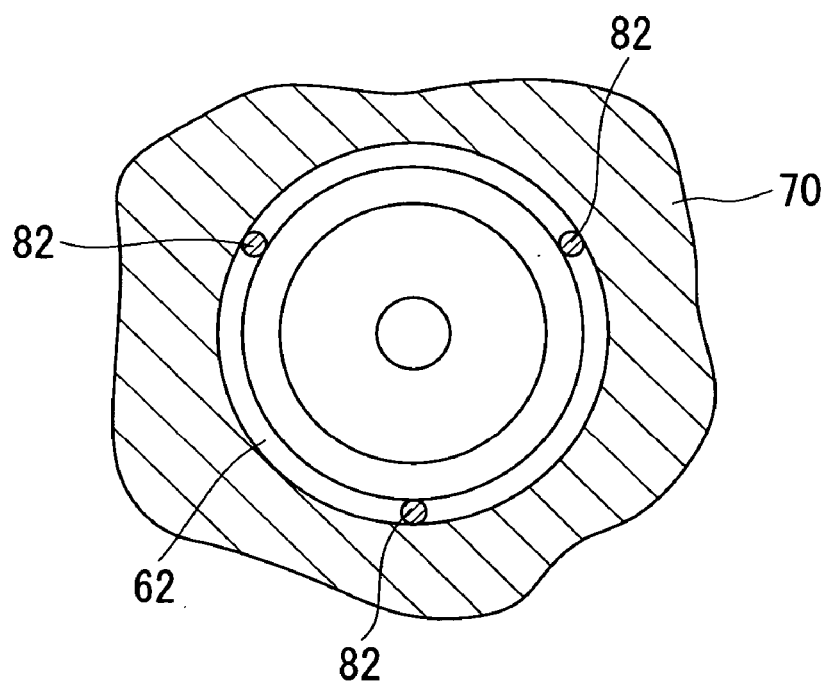
FIG. 6 a cross-sectional view illustrating alignment pins inserted into a small gap.

In FIG. 3, the horizontal axis represents the length (mm) in the radial direction, where the position of the central axis A1 is 0 mm. The vertical axis represents the detected magnetic flux density (Gauss). In FIG. 3, reference characters a to c represent the measurement positions according to a comparative example of this embodiment and are positions between the stator poles 3a, as shown in FIG. 2 (refer to Line C in FIG. 2). Reference characters d to f represent the measurement positions according to this embodiment. The positions between the stator poles 3a according to the comparative example correspond to the positions indicated in Patent Document 1 (refer to FIG. 6 in Patent Document 1).

The white dots in FIG. 3 represent the data at the positions (Line B in FIG. 2) according to this embodiment, and the white triangles represent the data at the positions according to the comparative example (Line C in FIG. 2). As is apparent from FIG. 3, the positions according to this embodiment, i.e., the upper areas of the stator poles 3a, have less magnetic leakage flux than the positions according to the comparative example, i.e., between the stator poles 3a. This is particularly significant at the inner peripheral side.

In the drawing, data according to Patent Document 1 is also shown. As the data according to Patent Document 1, the data shown in FIG. 9 of Patent Document 1 was used. In FIG. 3, the white squares represent the data from the positions corresponding to above the stator poles 3a (this embodiment), and the crosses represent the data from the positions corresponding to between the stator poles 3a (comparative example). It should be noted that the data according to Patent Document 1 was collected with the shield plate removed (refer to p. 13, line 1 in Patent Document 1).

Compared with the data disclosed in Patent Document 1, the following holds. According to the data in Patent Document 1, in the inner peripheral section, the magnetic flux densities above the stator poles 3a and between the stator poles 3a did not differ. However, according to the data collected when a shield plate was provided, as in this embodiment (the white triangles and the white squares), the magnetic flux densities above the stator poles 3a were significantly lower than those between the stator poles 3a. This knowledge was gained for the first time when the magnetic flux was measured in the presence of the shield plate.

Therefore, as in this embodiment, by moving the magnetic heads 61 forward and backward over the stator poles 3a, reading and writing errors can be prevented as much as possible because the magnetic heads 61 are moved forward and backward along sections with less magnetic leakage flux. In particular, this is significantly advantageous at the inner peripheral section where many reading and writing errors occur. Therefore, the forward and backward positions of the magnetic heads 61 may be between the stator poles 3a at the outer peripheral side and over the stator poles at the inner peripheral side. In other words, even if the magnetic heads 61 do not move forward and backward over the stator poles 3a at the outer peripheral side, it is acceptable so long as they move forward and backward over the teeth sections 3c of the stator poles 3a at the inner peripheral side. More specifically, it is acceptable so long as the trajectory of the magnetic heads 61 moved forward and backward passes through the area within the width W of the teeth sections 3c (refer to FIG. 2).

Next, a method of producing the HDD 1 according to this embodiment will be described.

The assembly of the HDD 1, in general, is described below.

First, the stator core 3 around which the coils 3b are wound and the sleeve main body 27 are fixed to the base member 2. Then, after disposing the shaft 11 and the counter plate 29, the hub 5 to which the permanent magnet 51 is fixed is fixed to the shaft 11. Then, the shield plate 70 is disposed in a manner such that it covers the stator core 3 from above. Then, after maintaining a uniform small gap 62 in the circumferential direction with respect to the outer peripheral section of the disk section 50 of the hub 5, the shield plate 70 is fixed to the base member 2.

Figure 4:
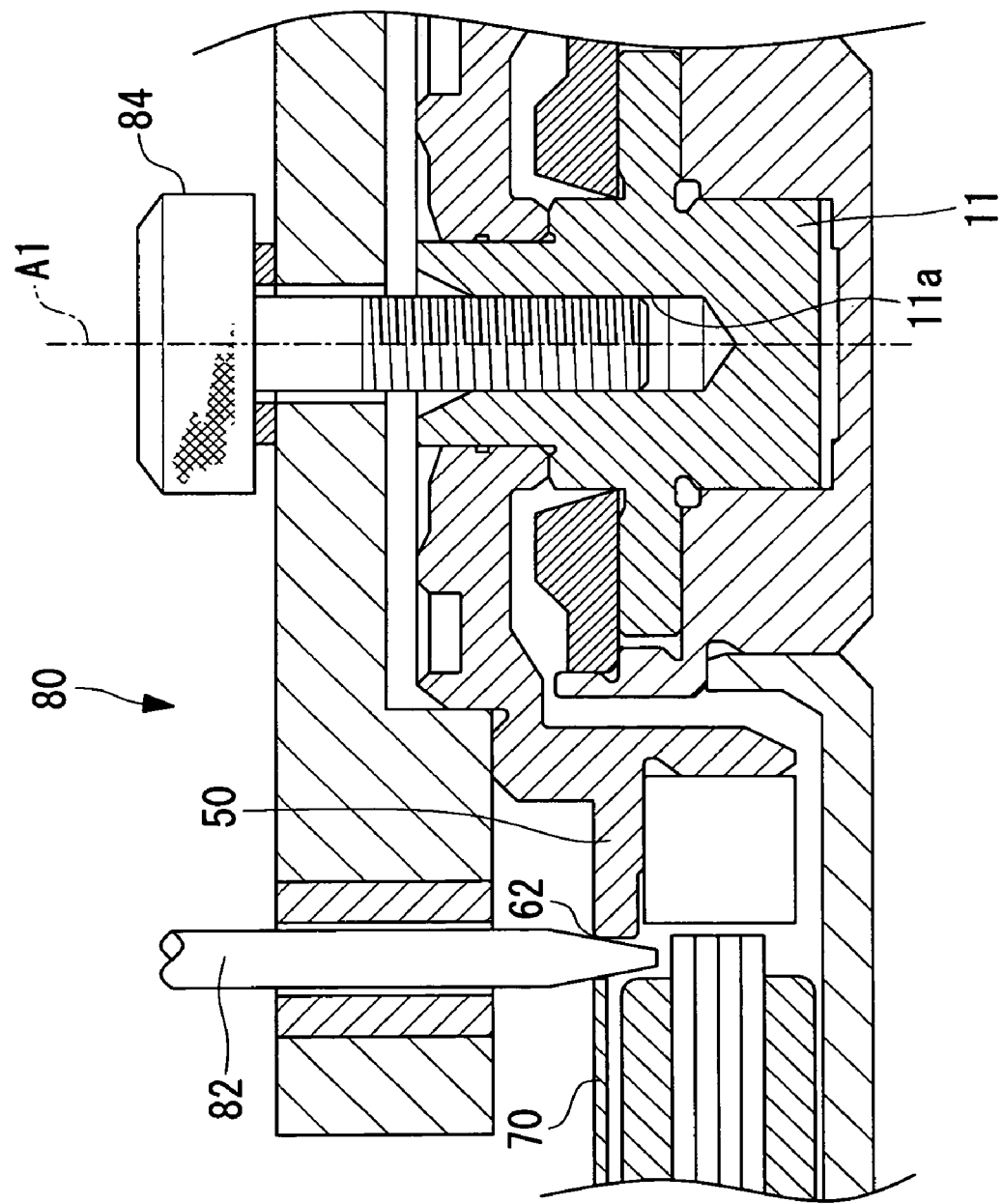
FIG. 4 a cross-sectional view illustrating an alignment jig in a mounted state.

In this embodiment, the following method is employed to maintain the small gap 62 uniform in the circumferential direction. FIG. 4 illustrates an alignment jig 80 in a mounted state.

Figure 5:
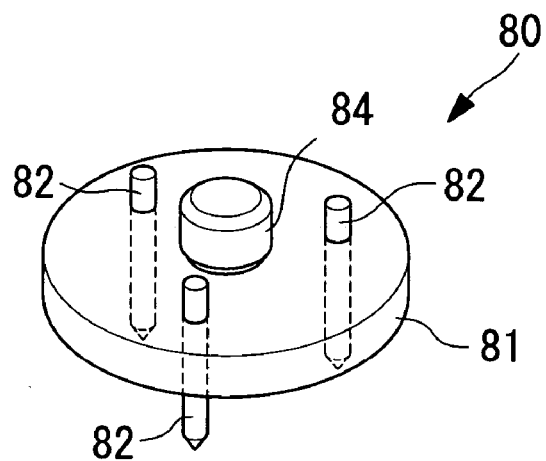
FIG. 5 a perspective view of the alignment jig.

As shown in FIG. 5, the alignment jig 80 includes three alignment pins 82 in a disk section 81. The alignment pins 82 are disposed such that they can be inserted into the small gap 62, which is toric when viewed from the top, at different angular positions (refer to FIG. 6). Each of the alignment pins 82 independently moves forward and backward with respect to the small gap 62 by driving means, not shown in the drawings. The tips of the alignment pins 82 are tapered.

A bolt 84 that is screwed into the screw groove 11a formed in the central axis A1 of the shaft 11 is provided at the center of the alignment jig 80.

As shown in FIG. 4, the alignment jig 80 having the above-described structure is mounted by screwing the bolt 84 into the screw groove 11a of the shaft 11. In this state, the alignment pins 82 are at a retracted position with respect to the small gap 62.

After the bolt 84 is screwed into the screw groove 11a, the alignment pins 82 are inserted, one by one, into the small gap 62. Then, each of the three alignment pins 82 is independently moved up and down to adjust the gap. In this way, after the distance in the circumferential direction of the small gap 62 is maintained to be uniform, the outer periphery of the shield plate 70 is fixed to the base member 2 by laser welding.

In this way, in the production method according to this embodiment, a method of maintaining the small gap 62 uniform in the circumferential direction by the alignment pins 82 is employed. Therefore, even when the small gap is extremely small (for example, about 0.1 mm), the gap can be managed accurately during production. This is especially effective when the distance of the small gap 62 has to be strictly controlled to prevent the magnetic leakage flux at the inner periphery being a problem when the magnetic head accesses the inner periphery of the magnetic disk having a small diameter, such as 1 inch.

According to the above-described production method, the HDD 1 after production has the following geometric characteristics.

Figure 7:
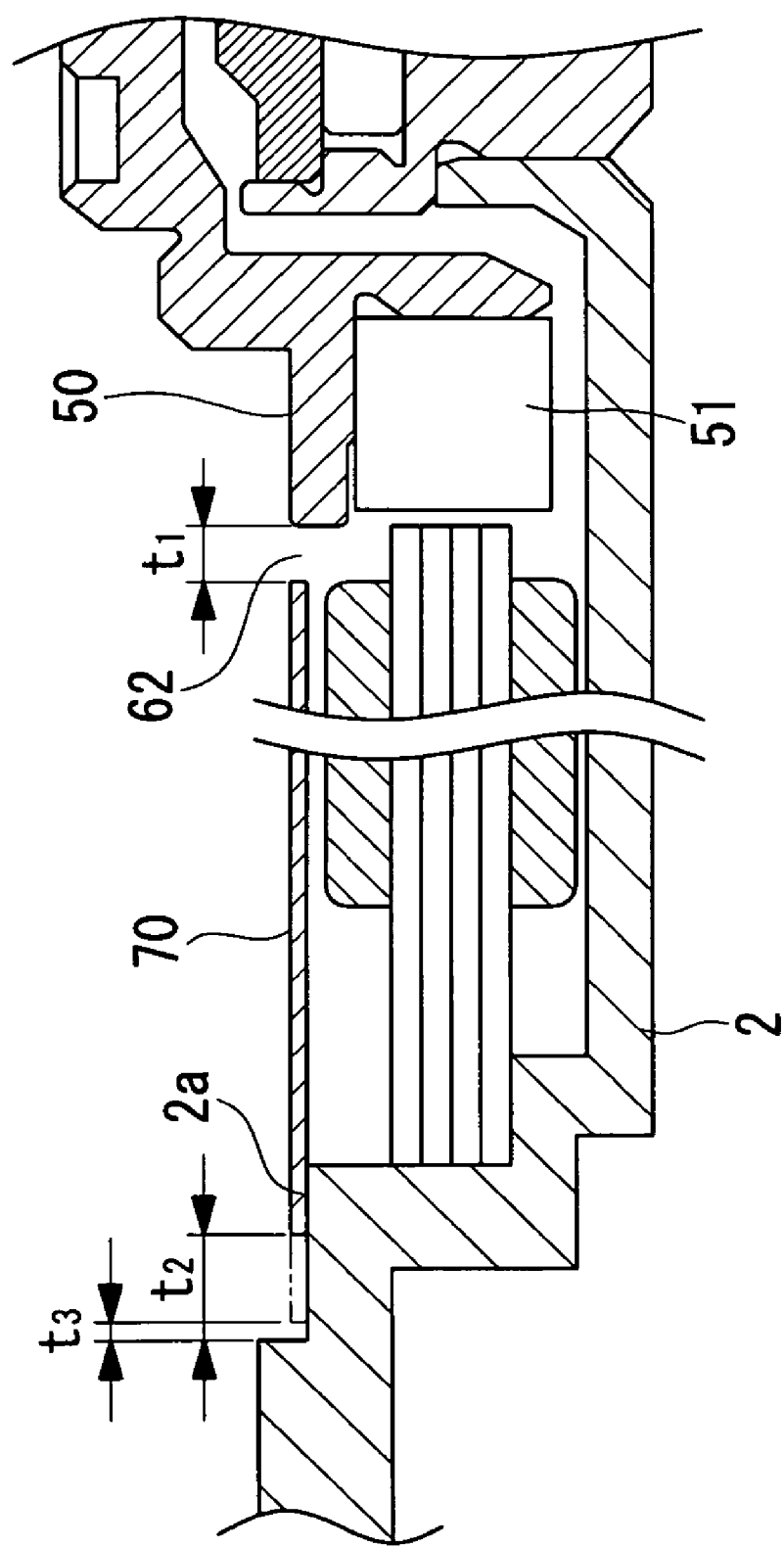
FIG. 7 a cross-sectional view illustrating the position of a shield plate when the alignment jig is used.

Refer to FIG. 7. According to a conventional method that does not use the alignment jig 80, a shield plate 70 was aligned by engaging (by telescopic engagement) it to a depression 2a provided on the base member 2, and then the outer peripheral section of the shield plate 70 was fixed with an adhesive. Therefore, the distance t1 of the small gap 62 was determined in accordance with the engagement state and was t1>t3 (where t3 represents the distance between the outer periphery of the shield plate 70 and the inner periphery of the depression 2a). To increase the alignment accuracy of the shield plate 70, machining was carried out on the inner periphery of the depression 2a. Therefore, additional machining costs were required for production of the base member 2, causing an increase in cost.

In contrast, according to this embodiment, by using the alignment jig 80, after a small gap t1 is set by the alignment jig 80, the shield plate 70 is fixed to the base member 2. Therefore, the distance t2 between the outer periphery of the shield plate 70 and the inner periphery of the depression 2a does not have to be controlled, and the relationship t1<t2 is established. Since the shield plate 70 does not have to be engaged with the base member 2, not only can the depression 2a be omitted, but also the inner periphery of the depression 2a does not have to be machined. Therefore, by omitting the machining, costs can be reduced. Furthermore, since the depression 2a does not have to be constructed and machining does not have to be carried out, a simple shape can be employed, the base member 2 can be produced by press work, and the cost can be reduced.

By using the alignment jig 80, contact marks are formed on the inner edge of the shield plate 70 and the outer edge of the disk section 50 of the hub 5 that are in contact with the alignment pins 82. By checking these contact marks, it can be determined whether or not alignment of the small gap 62 has been carried out using the alignment jig 80.

Figure 8:
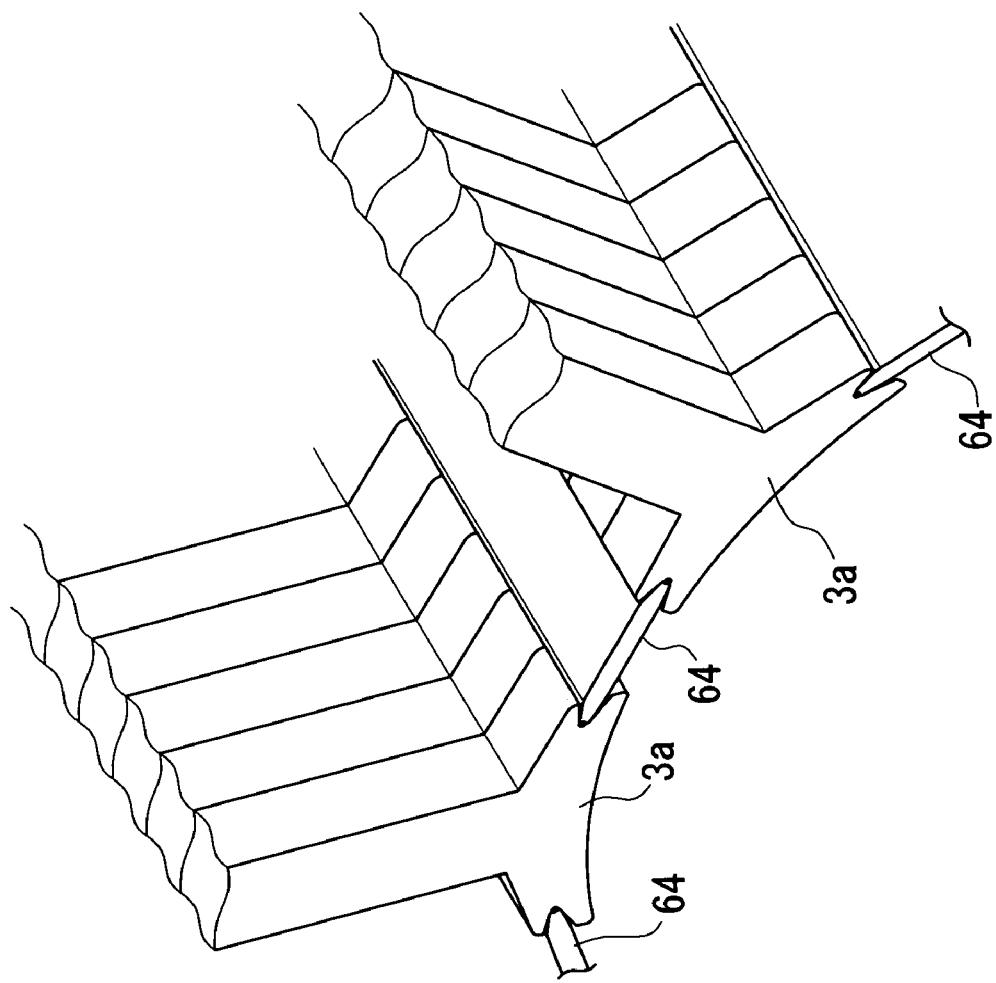
FIG. 8 a perspective view of a modification of the first embodiment.

As shown in FIG. 8, wedges 64 constructed of a magnetic material (iron or silicon steel plate) may be provided in such a manner as to cover the slots between the stator poles 3a. The wedges 64 are fixed to the stator poles 3a by laser welding. Since the wedges 64 absorb magnetic flux generated between the slots, the magnetic leakage flux can be reduced. The insertion directions of the wedges 64 are adjusted by setting the wedges 64 to be longer or shorter than the thickness of the stator poles 3a in the stacked direction, while taking into consideration the magnetic leakage flux and the concentration of magnetism. In particular, when the number of stator cores that are stacked is small, an advantage is afforded in that there is no difficulty in assembly when inserting the wedges 64. As in this embodiment, when an inner rotor structure is employed, large slot openings are required for winding the coils. However, by inserting the wedges 64, an increase in the magnetic leakage flux due to enlarged slot openings can be prevented.

Figure 9:
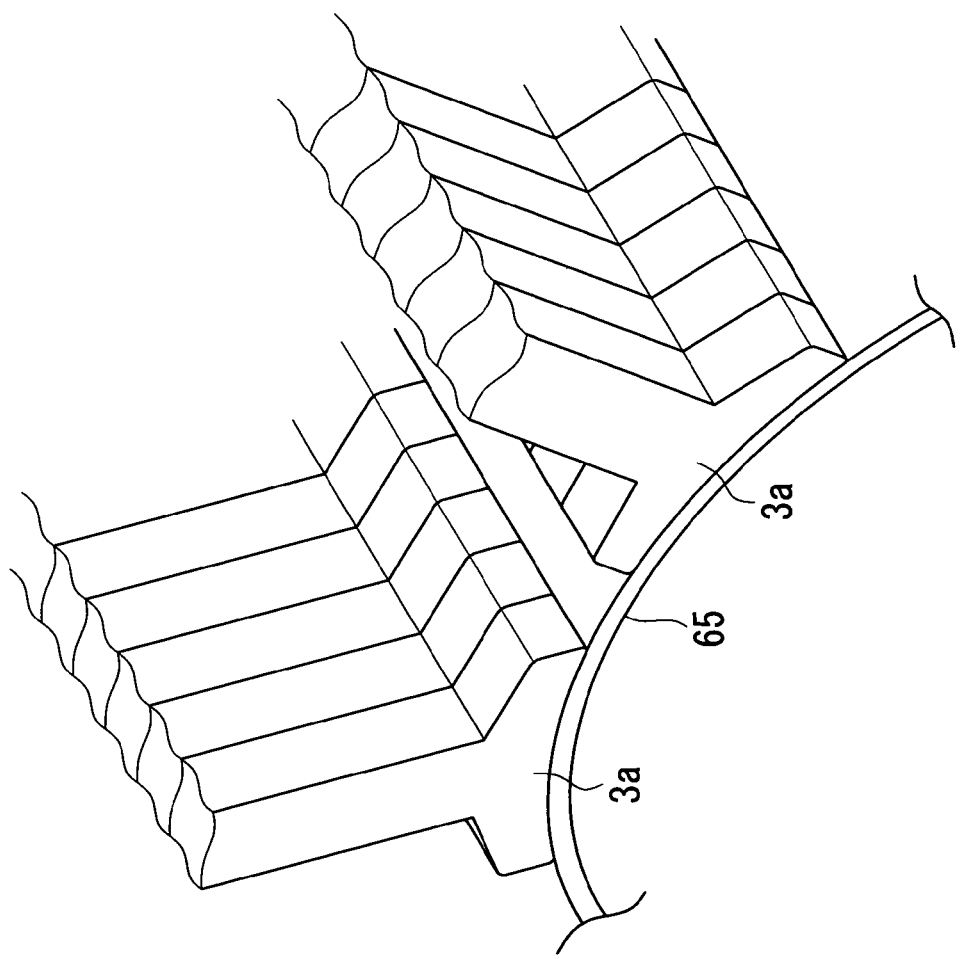
FIG. 9 a perspective view of another modification of the first embodiment.

As shown in FIG. 9, instead of the wedges 64, a ring-shaped member 65 constructed of a magnetic material may be provided at the tips of the stator poles 3a. Since the ring-shaped member 65 absorbs the magnetic flux generated between the slots, the magnetic leakage flux can be reduced. The ring-shaped member 65 is fixed to the stator poles 3a by press-fitting. The ring-shaped member 65 may be endless or may be fixed to the stator poles 3a by laser welding, with gaps provided at each end section at the beginning and end of the winding.

Figure 10:
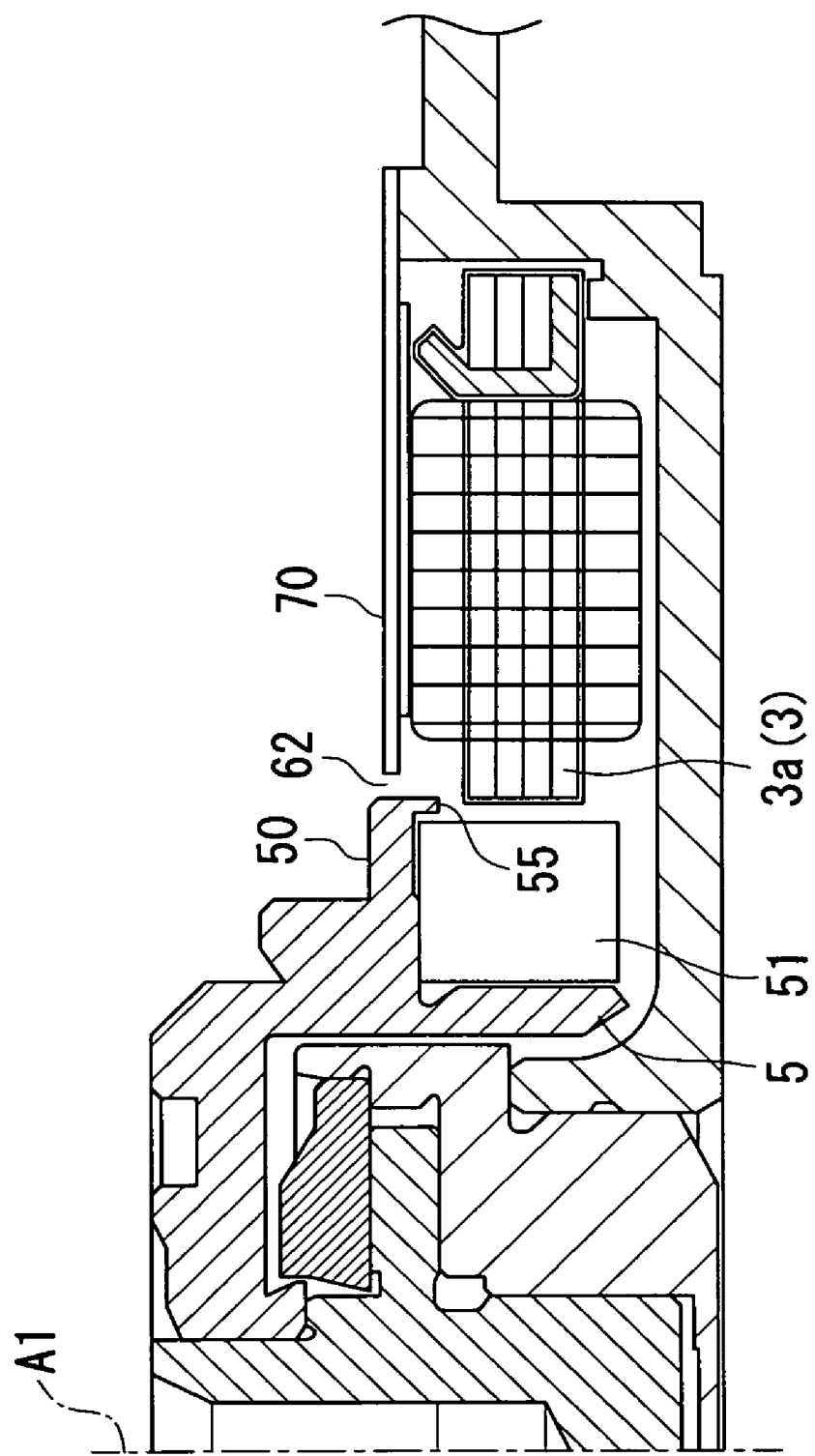
FIG. 10 a cross-section of an HDD according to a second embodiment of the present invention.

Next, a second embodiment of the present invention will be described with reference to FIG. 10. In this embodiment, the shape of the disk section 50 of the hub 5 differs from that according to the first embodiment. Furthermore, in the first embodiment, the forward and backward positions of the magnetic head are defined on the stator poles 3a. However, according to this embodiment, any position is acceptable. Other structures are the same as the first embodiment.

A protruding edge section 55, protruding toward the permanent magnet 51 side (lower area in the drawing), is provided on the outer periphery of the disk section 50 of the hub 5. The protruding edge section 55 is toric. The small gap 62 is formed between the outer edge of the disk section 50, provided with the protruding edge section 55, and the inner edge section of the shield plate 70.

According to this embodiment, the magnetic flux emitted from the permanent magnet 51 side to the magnetic disk side (upper area in the drawing) is blocked by the protruding edge section 55, preventing the magnetic flux from leaking from the small gap 62 to the magnetic disk side.

Figure 11:
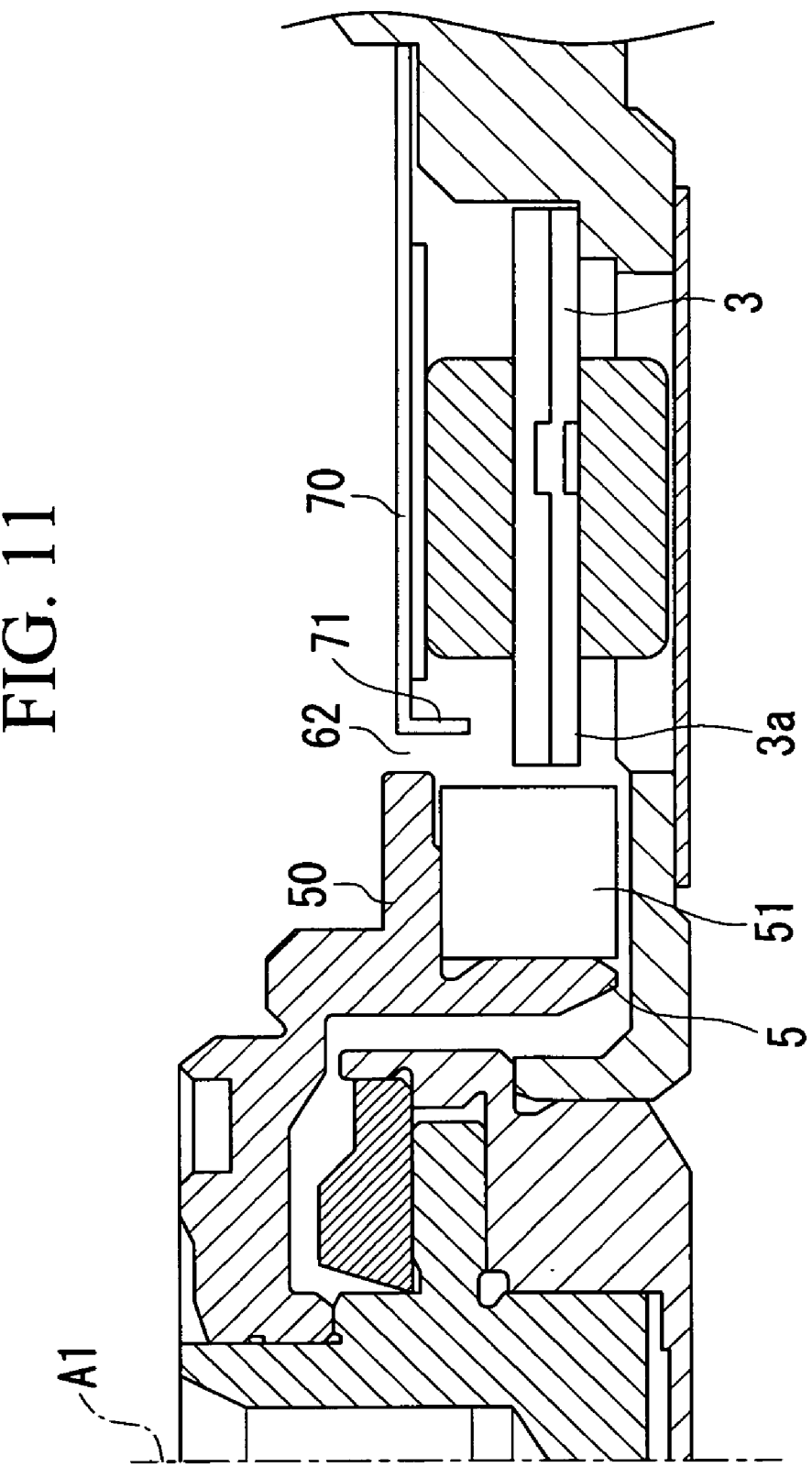
FIG. 11 a cross-section of an HDD according to a third embodiment of the present invention.

Next, a third embodiment of the present invention will be described with reference to FIG. 11. According to this embodiment, the shape of the inner edge section of the shield plate 70 differs from that according to the first embodiment. According to the first embodiment, the forward and backward positions of the magnetic head are defined on the stator poles 3a. However, according to this embodiment, any position is acceptable. Other structures are the same as the first embodiment.

A bent section 71 that is bent toward the stator core 3 side is provided on the inner edge section of the shield plate 70. The bent section 71 is toric and is formed along the inner edge of the shield plate 70. The bent section 71 blocks the magnetic flux emitted from the stator core 3 side to the magnetic disk side (upper area in the drawing), preventing the magnetic flux leaking from the small gap 62 to the magnetic disk side.

The bent section 71 according to this embodiment and the protruding edge section 55 (refer to FIG. 10) according to the second embodiment may be combined.

Next, a fourth embodiment of the present invention will be described with reference to FIG. 12. According to this embodiment, the positional relationship of the outer edge of the disk section 50 of the hub 5 and the inner edge section of the shield plate 70 differs from that of the first embodiment. In the first embodiment, the forward and backward positions of the magnetic head are defined at the stator poles 3a. However, according to this embodiment, any position is acceptable. Other structures are the same as the first embodiment.

Figure 12:
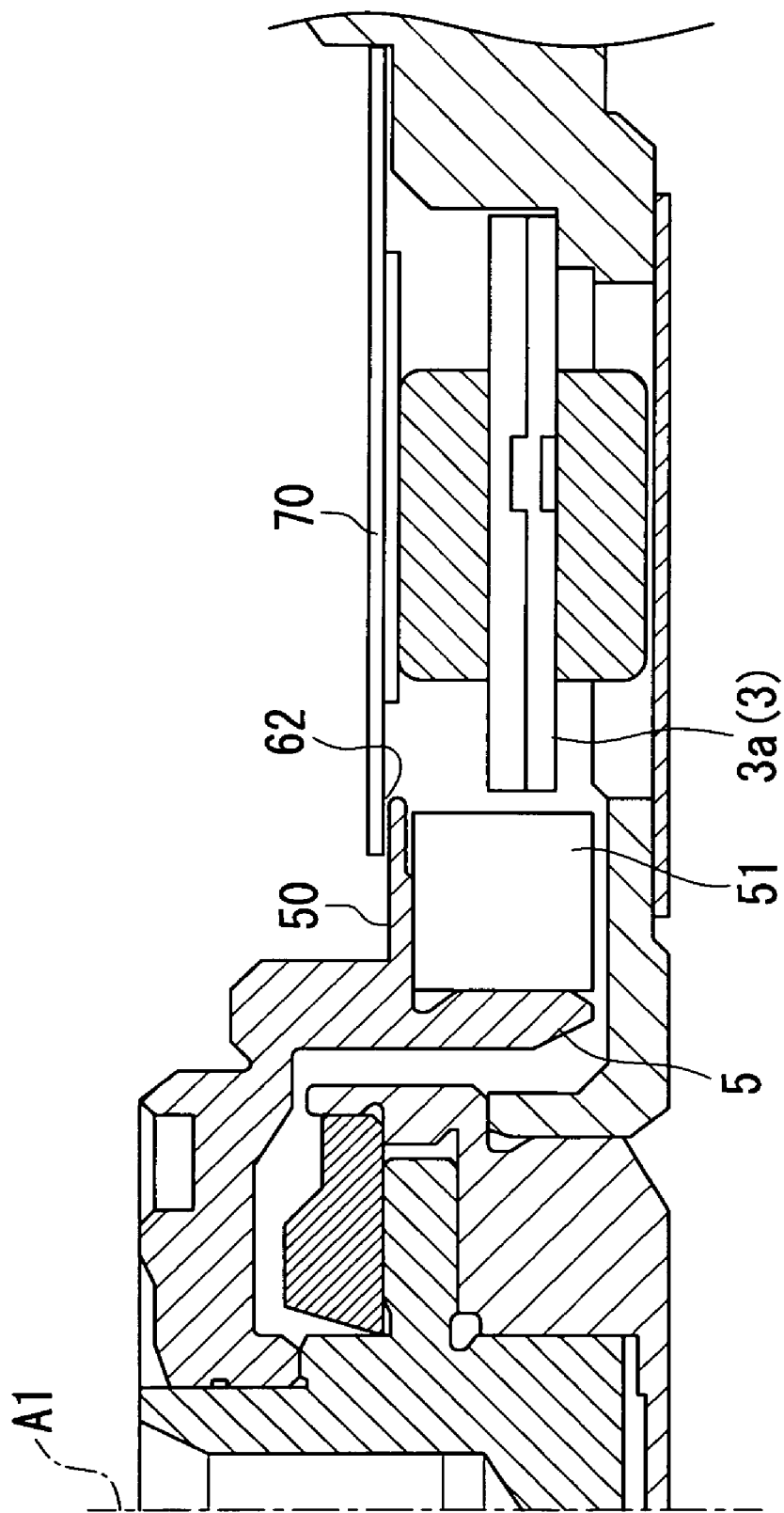
FIG. 12 a cross-section of an HDD according to a fourth embodiment of the present invention.

As shown in FIG. 12, the inner edge section of the shield plate 70 is disposed in such a manner as to cover the outer edge section of the disk section 50 of the hub 5 from the above. Therefore, the small gap 62 between the disk section 50 of the hub 5 and the shield plate 70 is formed between the back surface of the inner edge section of the shield plate 70 and the front surface of the disk section 50 of the hub 5. In this way, the opening of the small gap 62 does not face the magnetic disk side (upper area in the drawing). In this way, even if magnetic flux leaks from the small gap, the magnetic flux can be prevented from reaching the magnetic disk side. Furthermore, the rotation of the disk section 50 causes centrifugal force to be applied to the small gap 62, preventing dust that is generated at the stator core 3 side from entering the magnetic disk side.

Various modifications of the above-described embodiments may be provided as described below within the scope of the present invention.

For example, the modification described in conjunction with the first embodiment (FIGS. 8 and 9), may be employed in other embodiments.

According to the above-described embodiments, the shield plate 70 is constructed of martensitic stainless steel. However, the shield plate 70 is not limited and may be constructed of any magnetic material that prevents the magnetic flux moving in and out of at least the stator poles 3a and the coils 3b from reaching the magnetic heads. Therefore, the shield plate 70 may be constructed of, for example, permalloy (Ni alloy) or cemendule (Ni—Co alloy), which are high-magnetic-permeability materials. The permalloy and the cemendule efficiently react to a high-frequency alternating magnetic field.

The rotor R is not limited to being rotatably supported by the hydrodynamic pressure bearing 7 using lubricant oil. For example, the rotor R may be supported by a ball bearing.

The invention claimed is:

1. An information recording and playback apparatus comprising:
   a rotating body rotatably holding a magnetic disk and being provided with a permanent magnet on an outer peripheral surface of the rotating body;
   a stator core fixed to a base member, the stator core protruding to the inner side in the radial direction in such a manner as to oppose the permanent magnet, the stator core including a plurality of stator poles around which winding wires are wound;
   a shield member disposed between the magnetic disk and the stator core in such a manner as to cover the stator core while leaving a small gap between the shield member and the rotating body, the shield member blocking magnetic flux from the permanent magnet and the stator core; and
   a magnetic head for carrying out recording and playback of the magnetic disk by moving forward and backward between the shield member and the magnetic disk,
   wherein the magnetic head moves forward and backward within a width W of a teeth section which is provided at a tip of one of the stator poles, the teeth section extending in the circumferential direction.

2. An information recording and playback apparatus according to claim 1; wherein magnetic material is provided between the stator poles.

3. An information recording and playback apparatus according to claim 1; wherein a ring-shaped member constituted of magnetic material is provided on the rotating body sides of the stator poles.

4. An information recording and playback apparatus comprising:
   a rotating body rotatably holding a magnetic disk and being provided with a permanent magnet on an outer peripheral surface of the rotating body;
   a stator core fixed to a base member, the stator core protruding to the inner side in the radial direction in such a manner as to oppose the permanent magnet, the stator core including a plurality of stator poles around which winding wires are wound;
   a shield member disposed between the magnetic disk and the stator core in such a manner as to cover the stator core while leaving a small gap between the shield member and the rotating body, the shield member blocking magnetic flux from the permanent magnet and the stator core; and
   a magnetic head for carrying out recording and playback of the magnetic disk by moving forward and backward between the shield member and the magnetic disk,
   wherein the rotating body includes a disk section interposed between the permanent magnet and the magnetic disk in such a manner as to cover the permanent magnet,
   a toric protruding edge section protruding to the outer peripheral surface side of the permanent magnet is provided on the outer edge of the disk section, and
   the small gap is formed between the inner edge section of the shield member and the outer edge of the disk section.

5. An information recording and playback apparatus according to claim 4; wherein magnetic material is provided between the stator poles.

6. An information recording and playback apparatus according to claim 4; wherein a ring-shaped member constituted of magnetic material is provided on the rotating body sides of the stator poles.

7. An information recording and playback apparatus comprising:
   a rotating body rotatably holding a magnetic disk and being provided with a permanent magnet on an outer peripheral surface of the rotating body;
   a stator core fixed to a base member, the stator core protruding to the inner side in the radial direction in such a manner as to oppose the permanent magnet, the stator core including a plurality of stator poles around which winding wires are wound;
   a shield member disposed between the magnetic disk and the stator core in such a manner as to cover the stator core while leaving a small gap between the shield member and the rotating body, the shield member blocking magnetic flux from the permanent magnet and the stator core; and
   a magnetic head for carrying out recording and playback of the magnetic disk by moving forward and backward between the shield member and the magnetic disk,
   wherein the small gap is formed between the inner edge section of the shield member and the outer circumferential surface of the rotating body, and
   a toric bent section that is bent toward the stator core side is provided on the inner edge section of the shield member.

8. An information recording and playback apparatus according to claim 7; wherein magnetic material is provided between the stator poles.

9. An information recording and playback apparatus according to claim 7; wherein a ring-shaped member constituted of magnetic material is provided on the rotating body sides of the stator poles.

10. An information recording and playback apparatus comprising:
- a rotating body rotatably holding a magnetic disk and being provided with a permanent magnet on an outer peripheral surface of the rotating body;
- a stator core fixed to a base member, the stator core protruding to the inner side in the radial direction in such a manner as to oppose the permanent magnet, the stator core including a plurality of stator poles around which winding wires are wound;
- a shield member disposed between the magnetic disk and the stator core in such a manner as to cover the stator core while leaving a small gap between the shield member and the rotating body, the shield member blocking magnetic flux from the permanent magnet and the stator core; and
- a magnetic head for carrying out recording and playback of the magnetic disk by moving forward and backward between the shield member and the magnetic disk,
- wherein the rotating body includes a disk section interposed between the permanent magnet and the magnetic disk in such a manner as to cover the permanent magnet, and
- the small gap is formed between a back surface of the inner edge section of the shield member and a front surface of the disk section.

11. An information recording and playback apparatus according to claim 10; wherein magnetic material is provided between the stator poles.

12. An information recording and playback apparatus according to claim 10; wherein a ring-shaped member constituted of magnetic material is provided on the rotating body sides of the stator poles.

13. A method of producing an information recording and playback apparatus including a rotating body rotatably holding a magnetic disk and being provided with a permanent magnet on an outer peripheral surface of the rotating body, a stator core fixed to a base member, the stator core protruding to the inner side in the radial direction in such a manner as to oppose the permanent magnet, the stator core including a plurality of stator poles around which winding wires are wound, a shield member disposed between the magnetic disk and the stator core in such a manner as to cover the stator core while leaving a small gap between the shield member and the rotating body, the shield member blocking magnetic flux from the permanent magnet and the stator core, the method comprising the steps of:
- disposing the stator core, the rotating body, and the shield member on the base member;
- inserting a plurality of alignment pins into the small gap between the inner edge section of the shield member and the outer peripheral surface of the rotating body to keep the small gap substantially uniform in the circumferential direction; and
- fixing the shield member to the base member after retracting the alignment pins.

14. An information recording and playback apparatus comprising:
- a rotating body rotatably holding a magnetic disk and being provided with a permanent magnet on an outer peripheral surface of the rotating body;
- a stator core fixed to a base member, the stator core protruding to the inner side in the radial direction in such a manner as to oppose the permanent magnet, the stator core including a plurality of stator poles around which winding wires are wound;
- a shield member disposed between the magnetic disk and the stator core in such a manner as to cover the stator core while leaving a small gap between the shield member and the rotating body, the shield member blocking magnetic flux from the permanent magnet and the stator core; and
- a magnetic head for carrying out recording and playback of the magnetic disk by moving forward and backward between the shield member and the magnetic disk,
- wherein the magnetic head moves forward and backward over one of the stator poles at least at the inner peripheral side of the stator core.

15. An information recording and playback apparatus according claim 14; wherein magnetic material is provided between the stator poles.

16. An information recording and playback apparatus according to claim 14; wherein a ring-shaped member constituted of magnetic material is provided on the rotating body sides of the stator poles.

* * * * *